United States Patent
Skilton

(10) Patent No.: US 9,416,730 B2
(45) Date of Patent: Aug. 16, 2016

(54) BI-DIRECTIONAL VENTILATION SYSTEMS FOR USE WITH AIRCRAFT AND RELATED METHODS

(71) Applicant: The Boeing Company, Chicago, IL (US)

(72) Inventor: Timothy L. Skilton, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 810 days.

(21) Appl. No.: 13/755,963

(22) Filed: Jan. 31, 2013

(65) Prior Publication Data
US 2014/0208761 A1   Jul. 31, 2014

(51) Int. Cl.
| | | |
|---|---|---|
| F02C 7/16 | (2006.01) | |
| F02C 7/18 | (2006.01) | |
| F02C 7/32 | (2006.01) | |
| F02C 6/06 | (2006.01) | |
| B64D 33/08 | (2006.01) | |
| F02K 1/78 | (2006.01) | |

(52) U.S. Cl.
CPC . *F02C 7/18* (2013.01); *B64D 33/08* (2013.01); *F02C 6/06* (2013.01); *F02C 7/16* (2013.01); *F02C 7/32* (2013.01); *F02K 1/78* (2013.01); *F05D 2260/20* (2013.01); *Y02T 50/675* (2013.01)

(58) Field of Classification Search
CPC ............... F02C 6/06; F02C 7/16; F02C 7/18; F02C 7/32; B64D 33/08
USPC .......................................................... 244/58
See application file for complete search history.

(56) References Cited

U.S. PATENT DOCUMENTS

| | | | | |
|---|---|---|---|---|
| 2,173,896 A | * | 9/1939 | Caldwell ................ | B64D 33/08 123/41.59 |
| 2,352,793 A | * | 7/1944 | Burr ....................... | B64D 33/08 244/53 R |
| 2,548,794 A | * | 4/1951 | Hotz ....................... | F02C 7/12 60/266 |
| 4,608,819 A | * | 9/1986 | Colman ................. | F01D 17/02 361/690 |
| 5,272,870 A | | 12/1993 | Grieb et al. | |
| 5,351,476 A | | 10/1994 | Laborie et al. | |
| 7,337,605 B2 | * | 3/2008 | Hagshenas ........... | B64D 33/08 244/58 |

(Continued)

FOREIGN PATENT DOCUMENTS

| | | |
|---|---|---|
| DE | 2259580 | 6/1974 |
| EP | 1650407 | 4/2006 |
| EP | 2548805 | 1/2013 |

OTHER PUBLICATIONS

European Patent Office, "Extended European Search Report," issued in connection with European patent application No. 13199084.8-1754, dated May 27, 2014, 8 pages.

*Primary Examiner* — Patrick Hamo
(74) *Attorney, Agent, or Firm* — Hanley, Flight and Zimmerman, LLC

(57) ABSTRACT

Bi-directional nacelle ventilation and cooling systems for use with aircraft and related methods are disclosed. An example apparatus includes a passageway to fluidly couple an opening formed in a nacelle of an aircraft engine and an engine compartment of the nacelle. The opening provides an inlet into the engine compartment when passive airflow is available to vent or cool the engine compartment and the opening to provide an outlet from the engine compartment when forced air is needed to vent or cool the engine compartment. A fan is positioned in the passageway to provide the forced air when the passive air is unavailable.

20 Claims, 6 Drawing Sheets

(56) References Cited

U.S. PATENT DOCUMENTS

| | | | | |
|---|---|---|---|---|
| 8,794,571 B2* | 8/2014 | Baumgardt | ............... | B64C 1/26 165/96 |
| 2004/0118105 A1* | 6/2004 | Aitchison | ............... | F01D 25/12 60/266 |
| 2010/0146986 A1* | 6/2010 | Hussain | ................. | F01D 25/14 60/806 |
| 2011/0017426 A1* | 1/2011 | Baumgardt | ............. | B64C 21/06 165/59 |
| 2012/0006938 A1 | 1/2012 | Gatzke | | |

* cited by examiner

BI-DIRECTIONAL VENTILATION SYSTEMS FOR USE WITH AIRCRAFT AND RELATED METHODS

FIELD

The present disclosure relates generally to aircraft and, more particularly, to bi-directional ventilation systems for use with aircraft and related methods.

BACKGROUND

Commercial aircraft or jetliners typically employ aircraft engines having a turbine engine supported by a nacelle. The nacelle also houses other components of the aircraft and/or the aircraft engine that are positioned within the nacelle. However, the aircraft engine generates significant amounts of heat during operation, which could affect the operation of the components. To maintain the components positioned in the nacelle within acceptable operating temperatures and/or to comply with other industry regulations and/or safety standards, the nacelle is often cooled or vented via a nacelle cooling and ventilation system. Typically, known nacelle cooling and ventilation systems employ ram cooling air to cool the components inside the nacelle. The ram cooling air is provided to the components via an inlet scoop provided on the nacelle.

However, during non-flight conditions, ram cooling air is typically not available. To cool the components, the ventilation system often employs a fan or blower to direct forced air across the components and is vented to at least one outlet opening formed on the nacelle housing. However, the openings (e.g., the inlet and the outlet) formed in the nacelle housing may increase drag, thereby reducing the aerodynamic efficiency of the nacelle.

SUMMARY

An example apparatus includes a passageway to fluidly couple an opening formed in a nacelle of an aircraft engine and an engine compartment of the nacelle. The opening provides an inlet into the compartment when passive airflow is available to vent or cool the engine compartment and the opening provides an outlet from the compartment when forced air is needed to vent or cool the engine compartment. Passive fluid (e.g., air) flows through the passageway in a first direction from the opening to the engine compartment. A fan is positioned in the passageway to provide forced air when the passive air is unavailable. The fan directs the forced air to flow through the passageway in a second direction from the engine compartment to the opening. The first direction is opposite the second direction.

Another example apparatus includes an opening formed in a nacelle. The opening provides an inlet when passive airflow is available to cool or vent an engine compartment in the nacelle and an outlet when forced air is needed to cool or vent the engine compartment in the nacelle. A passageway fluidly couples the opening and the engine compartment and a blower assembly is interposed in the passageway. The blower assembly defining a first flow path of the passageway through which the passive air is to flow from the opening to the engine compartment and a second flow path of the passageway through which the forced air is to flow from the engine compartment to the opening.

An example method includes coupling an opening of a nacelle and an engine compartment of the nacelle via a ventilation passageway, the ventilation passageway having a blower system that defines a first path of the ventilation passageway and a second path of the ventilation passageway. The method includes deactivating the blower when passive air is available to vent or cool the engine compartment to enable the passive air to flow from the opening of the ventilation passageway to the engine compartment in a first direction via the first path, and activating the blower system when the passive air is unavailable to vent or cool the engine compartment to enable forced air to flow from the engine compartment to the opening of the ventilation passageway in a second direction via the second path.

The features, functions and advantages that have been discussed can be achieved independently in various embodiments or may be combined in yet other embodiments further details of which can be seen with reference to the following description and drawings.

Figure 1:
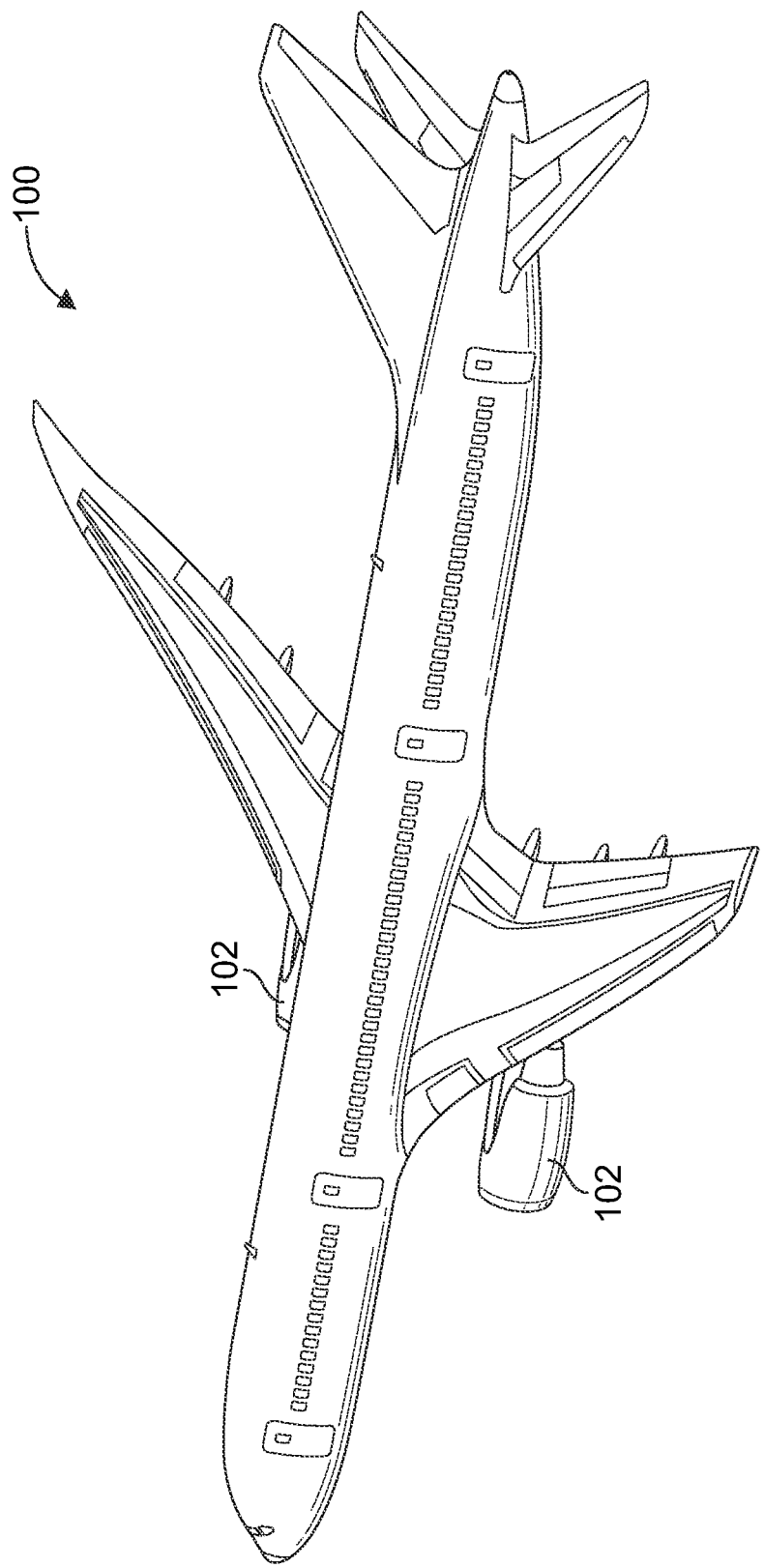
FIG. 1 is an illustration of an example aircraft that may embody the examples described herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Nacelle cooling and ventilation systems maintain components of an aircraft engine positioned in a nacelle within acceptable operating temperature ranges. More specifically, nacelle cooling and ventilation systems dissipate or vent heat generated by the aircraft engine during operation to maintain the temperature in the nacelle (e.g., engine compartments) below a maximum desired temperature to prevent damage to aircraft engine components positioned within the nacelle. Typically, nacelle cooling and ventilation systems employ cooling air to cool the aircraft engine components positioned inside the nacelle via, for example, a passageway. For example, the passageway is coupled to an opening formed on a housing of the nacelle, which includes an inlet scoop to direct the cooling air into the passageway.

Typically, cooling air is provided using available ram air (i.e., passive air) during flight conditions when the aircraft has a forward velocity. However, when passive or ram air is unavailable during, for example, taxiing prior to takeoff or subsequent to landing (e.g., relatively low or zero forward velocity conditions), ram air is unavailable or insufficient to provide venting or cooling. When ram air is unavailable, the nacelle cooling and ventilation system typically provides forced air ventilation (e.g., via a blower). The forced air is vented to an exterior of the nacelle or the atmosphere via an outlet or opening formed in the nacelle. However, multiple openings formed in the nacelle associated with the nacelle ventilation system may increase engine drag, thereby reducing an aerodynamic efficiency of the nacelle.

The example nacelle cooling and ventilation systems disclosed herein significantly improve aircraft engine aerodynamic efficiency. More specifically, the example nacelle cooling and ventilation systems disclosed herein significantly reduce aircraft engine drag by reducing the number of openings in a housing of a nacelle needed for ventilation. In particular, a single opening in a nacelle housing provides an inlet during passive air ventilation (e.g., during forward velocity conditions) and an outlet during forced air ventilation (e.g., during no forward velocity conditions). More specifically, the single opening provides an inlet during passive air ventilation and an outlet during forced air ventilation. Thus, the openings needed to enable operation of the ventilation system are reduced at least by half, thereby reducing the drag associated with the openings by approximately half. In other words, this reduction of openings (e.g., inlets and outlets and the are associated therewith) in the nacelle enable a more laminar flow over the nacelle that leads to significant drag reduction and, hence, reduction of fuel consumption associated with aircraft engine drag.

In some examples, the nacelle cooling and ventilation system employs a passageway to fluidly couple an opening formed in a nacelle and an engine compartment of the nacelle. A fan or blower assembly is positioned inside the passageway (e.g., in-line with the passageway) and may be coaxially and/or concentrically aligned with a longitudinal axis of the passageway. The blower assembly defines a first flow path through which passive air flows and a second flow path through which forced air flows. The blower assembly includes a fluid control device to enable the opening to operate between an inlet and an outlet. More specifically, the fluid control device enables fluid flow in a first direction during passive air ventilation and enables fluid flow in a second direction during forced air ventilation. For example, ram air is allowed to flow to an engine compartment of the nacelle when the flow control device is in a first position and forced air provided by the blower system or fan is allowed to flow from the engine compartment to the opening when the flow control device is in a second position. The flow control device may be manually operated and/or may be operated via a control system.

In some examples, the opening is provided near or adjacent an upper surface (e.g., a top) of the nacelle. In this manner, the opening aids fluid flow through the passageway during passive cooling. For example, passive air tends to naturally flow from the opening into the compartment during a flight condition. Further, providing the opening near the upper surface of the nacelle helps aid in the removal of heat during forced cooling or venting because the warmer air rises from the engine compartment toward the opening. As a result, a smaller sized blower or fan is needed, resulting in a blower or fan consuming less power.

FIG. 1 illustrates an example commercial aircraft 100 having one or more aircraft engines 102 (e.g., turbofan engines) that may embody aspects of the teachings of this disclosure. For example, each engine 102 of the aircraft 100 employs a nacelle cooling and ventilation system in accordance with the teachings disclosed herein. As described in greater detail below, the nacelle cooling system of the example aircraft engine 102 employs forced air ventilation during static conditions when ram air is not available and passive air ventilation when ram air is available. For example, during aircraft taxiing or subsequent to landing when the aircraft engine 102 is operating, a forward velocity of the aircraft is insufficient to provide passive air cooling. Thus, when passive or ram air is not available for cooling or venting, the ventilation system disclosed herein employs forced air to cool or vent generated heat from the aircraft engine. During aircraft flight, for example, forward velocity of the aircraft is sufficient to provide ram or passive air to cool or vent the components of the aircraft engine.

Figure 2:
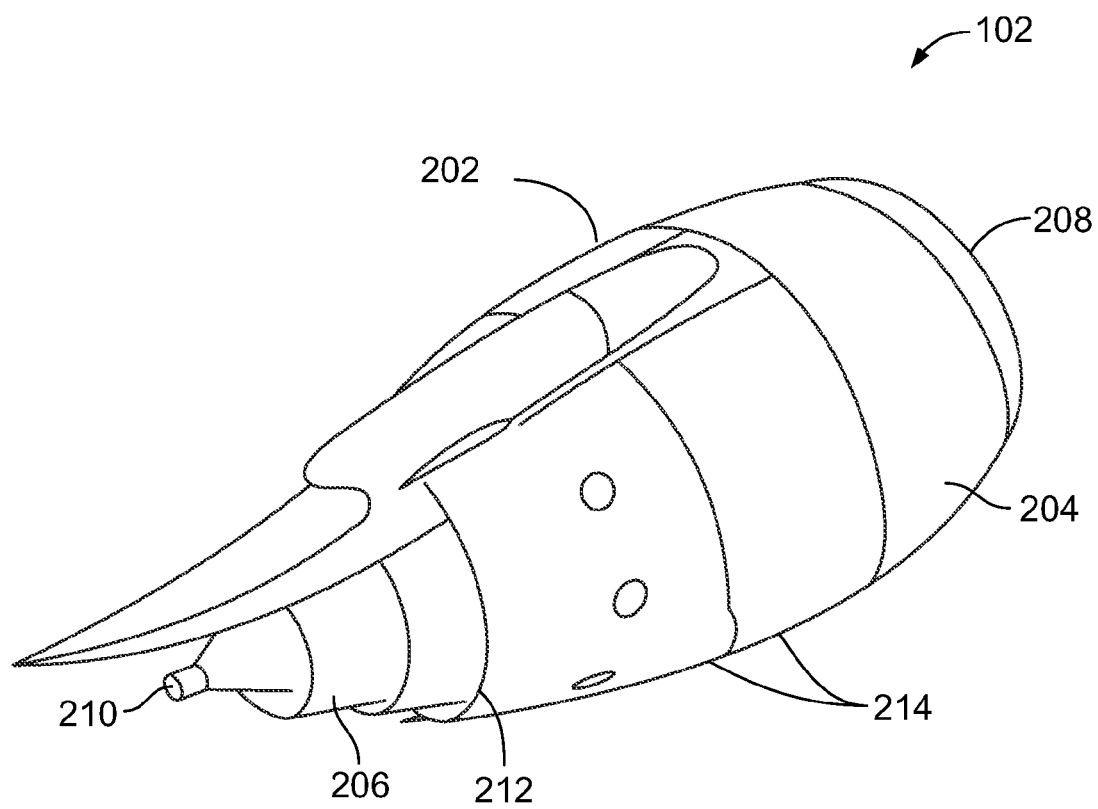
FIG. 2 illustrates an example aircraft engine having an example bi-directional ventilation system disclosed herein.

FIG. 2 is a perspective view of the example aircraft engine 102 of FIG. 1. The aircraft engine 102 includes a nacelle 202 that defines a housing having an aerodynamic outer surface to reduce drag. The nacelle 202 is arranged coaxially with a turbine engine 206, which is supported by the nacelle 202. The turbine engine 206 comprises one or more compressors (e.g., high-pressure and/or low-pressure compressors) to drive a fan positioned in a fan portion or cowling 204 of the nacelle adjacent an intake 208 that provides air to the compressors. The compressors provide compressed air to a combustion chamber of the turbine engine 206, which is mixed with fuel and ignited. The burning gases expand and blast out through a nozzle 210 of the turbine engine 206 adjacent an end 212 of the nacelle 202 to provide a forward thrust to the aircraft 100. In addition to supporting the turbine engine 206, the nacelle 202 defines one or more portions 214 to provide engine compartments surrounding the turbine engine 206 to house other engine components and/or other aircraft accessories such as electric generators, turbo compressors, environmental control system components, and/or any other component(s).

Figure 3:
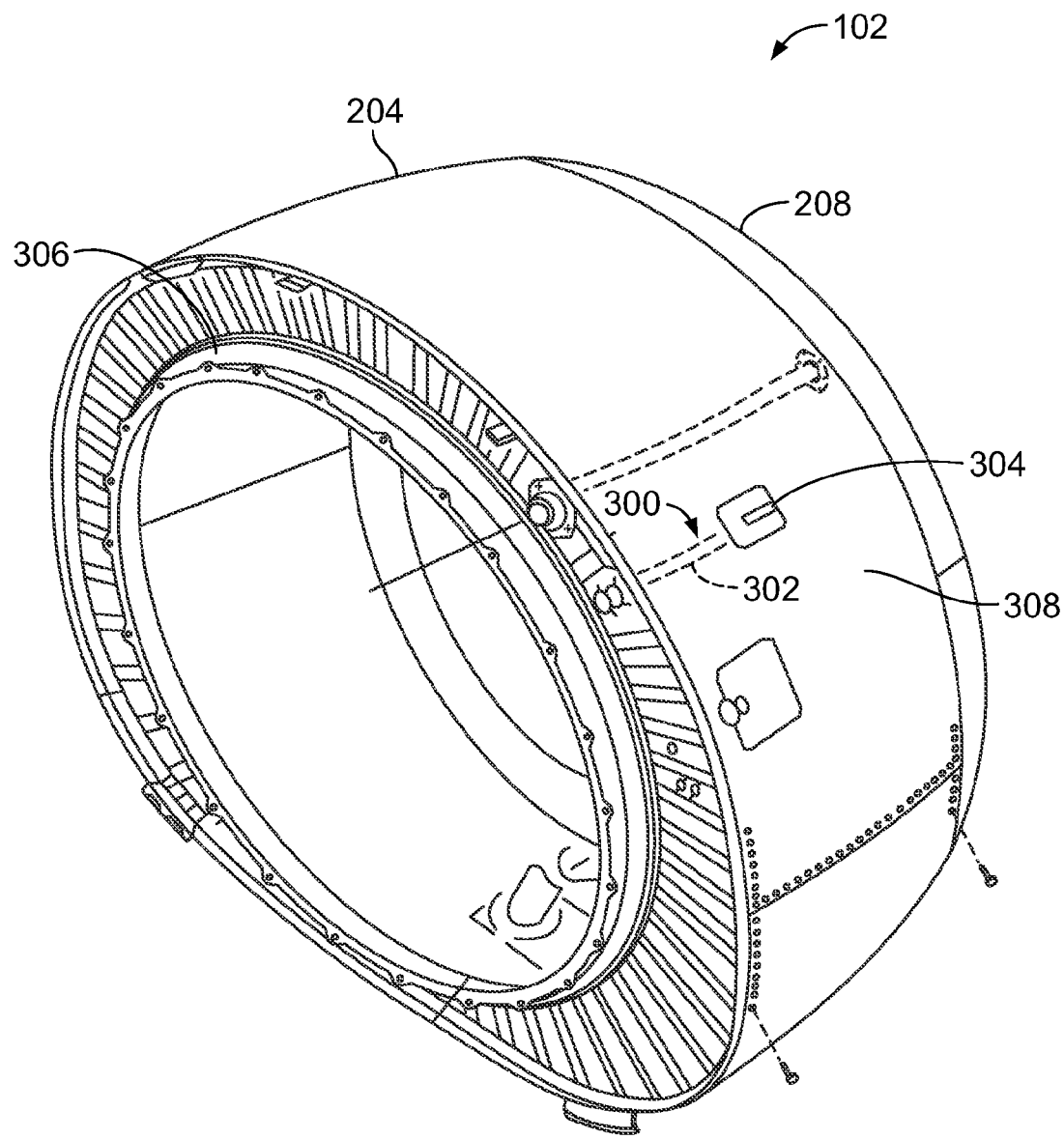
FIG. 3 is a partial view of the example aircraft engine of FIG. 2 illustrating the example bi-directional ventilation system.

FIG. 3 is perspective partial view of the aircraft engine 102 of FIGS. 1 and 2 illustrating an example nacelle cooling a ventilation system 300 in accordance with the teachings disclosed herein. The example ventilation system 300 of FIG. 3 vents or dissipates excess heat from the nacelle 202 or engine compartment that is generated by the turbine engine 206. The nacelle ventilation system 300 directs cooling air from the fan portion 204 of the nacelle 202 to one or more engine components of the nacelle 202. The ventilation system 300 of the illustrated example defines a passageway 302 between an opening 304 formed in nacelle 202 adjacent the fan portion 204 and the intake 208 and the engine compartment. In the illustrated example, the passageway 302 is a manifold, a duct or tubing and/or any other channel positioned between a nacelle body or structure 306 and a fairing or cover 308. The opening 304 of the illustrated example is positioned near or adjacent an upper surface of the nacelle 202 to help aid fluid flow into the compartment during passive cooling or ventilation and help aid in the removal of heat from the compartment to the opening 302 during forced cooling or ventilation. The opening 304 may include a scoop formed in the nacelle 202 or fairing 308 to help direct airflow into the opening 304.

Figure 4:
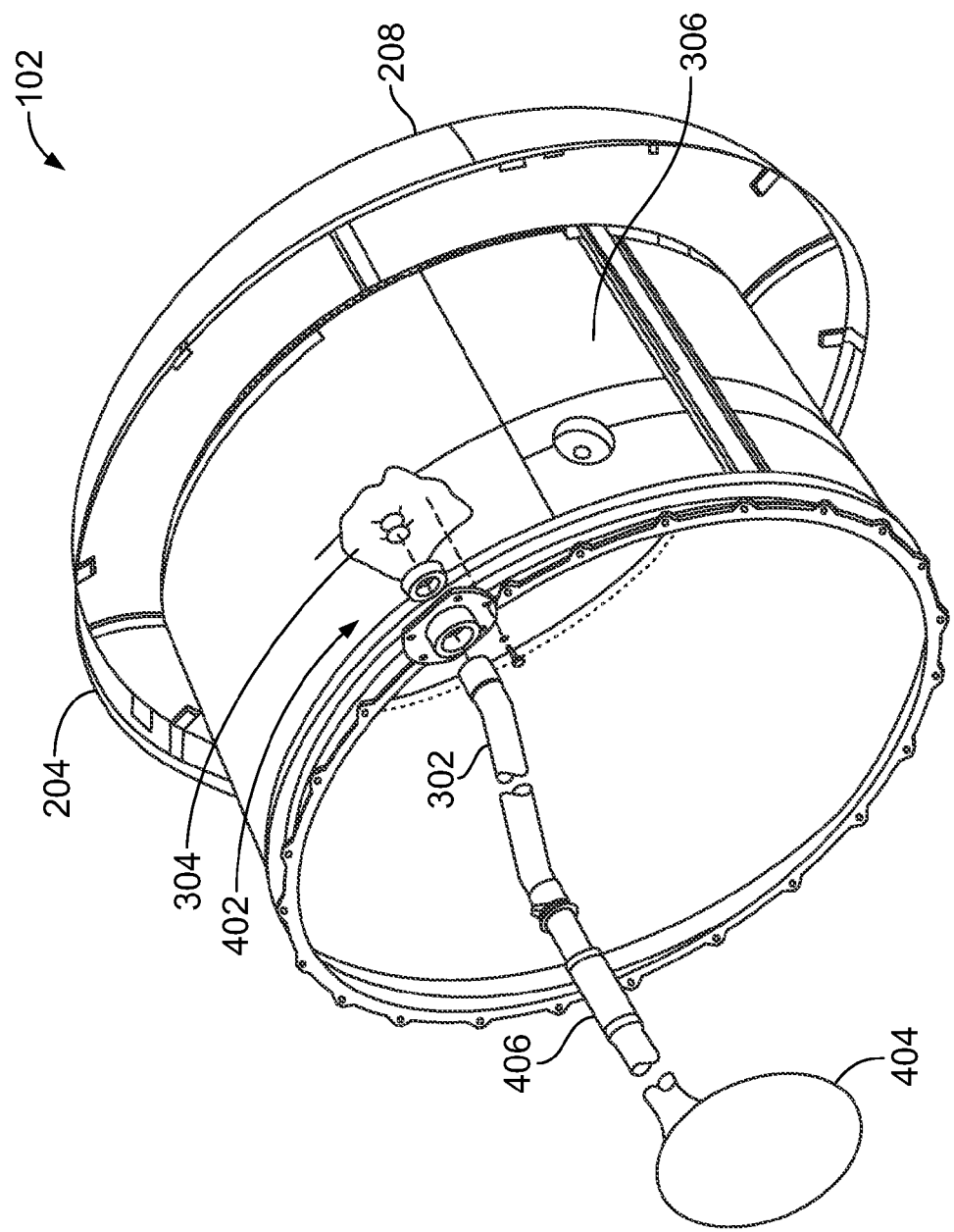
FIG. 4 is a partially exploded view of the example aircraft engine of FIGS. 1-3.

FIG. 4 is a partially exploded view of the example nacelle 202 of FIG. 3 showing the fairing 308 removed. As shown in FIG. 4, a bracket assembly 402 couples the passageway 302 to the opening 304. The passageway 302 extends between the opening 304 and an engine compartment 404 of the nacelle 202. As described in greater detail below, the opening 304 provides an inlet when passive or ram air is available for cooling or venting and an outlet when forced air is provided for cooling or venting. The ventilation system 300 includes a fluid flow diverter assembly 406 to change the direction of fluid flow between the opening 304 and the engine compartment 404. For example, the flow diverter assembly 406 allows passive or ram air to flow in a first direction between the opening 304 and the engine compartment 404 and allows forced air to flow in the second direction between the opening 304 and the engine compartment 404, the first direction being opposite the second direction.

Figure 5:
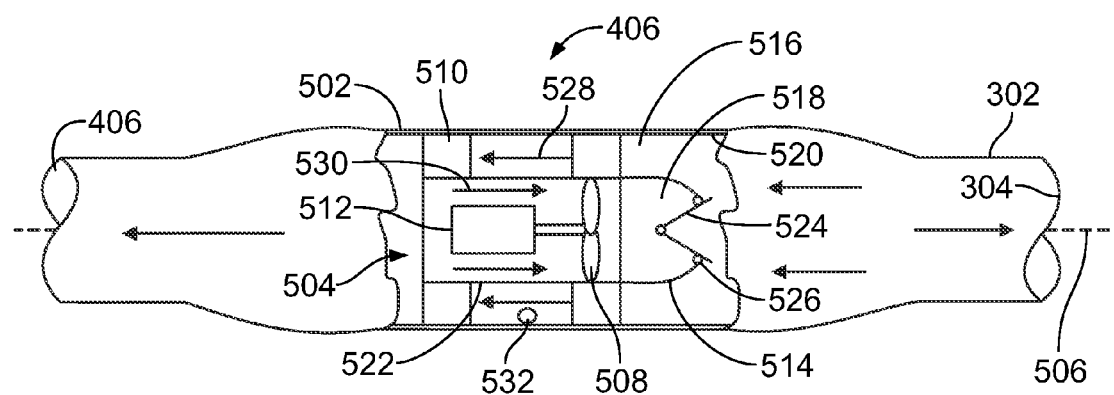
FIG. 5 is a schematic illustration of the ventilation system of FIGS. 1-3.

FIG. 5 is a schematic illustration of the flow diverter assembly 406 of the example ventilation system 300 of FIG. 4. The flow diverter assembly 406 defines a portion 502 of the passageway 302 and is coupled in-line with the passageway 302. In the illustrated example of FIG. 5, the example flow diverter assembly 406 includes a fan or blower assembly 504 interposed in the passageway 302 and positioned upstream from the engine compartment 404 and downstream from the opening 304. The blower assembly 504 is aligned with at least the portion 502 of the passageway 302. More specifically, the blower assembly 504 of the illustrated example is coaxially and/or concentrically aligned relative to a longitudinal axis 506 of the portion 502 of the passageway 302. In particular, a blower or fan 508 of the blower assembly 504 is concentrically and/or coaxially aligned with the longitudinal axis 506. A bracket or mounting structure 510 couples the blower assembly 504 to the portion 502 of the passageway 302. The blower assembly 506 of the illustrated example includes a motor 512 to drive the blower 508. The motor 512 and the blower 508 are coupled inside a second or forced fluid passageway 514 positioned in the passageway 302. The second passageway 514 may be a duct, tubing, a manifold and/or other channel to receive or direct a fluid.

When positioned in the passageway 302 (e.g., the portion 502 of the passageway 302), the second passageway 514 of the blower assembly 504 defines a first flow path 516 and a second flow path 518 different than the first flow path 516. The first flow path 516 is formed between an inner surface 520 of the passageway 302 and an outer surface 522 of the blower assembly 504 and/or the second passageway 514. The second flow path 518 is defined by the second passageway 514 and is separate from the first flow path 516. In particular, the first flow path 516 allows fluid flow from the opening 304 to the engine compartment 404 and the second flow path 518 allows fluid flow from the engine compartment 404 to the opening 304.

To control or enable fluid flow within the first flow path 516 and the second flow path 518, the example ventilation system 300 employs a flow control device 524 to selectively fluidly couple the opening 304 and the second flow path 518. The flow control device 524 is positioned upstream from the blower 508 and adjacent an opening 526 of the second passageway 514. More specifically, the flow control device 524 directs fluid flow in the first flow path 516 in a first direction represented by arrow 528 and allows fluid flow in the second flow path 518 in a second direction represented by arrow 530 in FIG. 5. In particular, the flow control device 524 moves between a closed position to allow fluid to flow around the blower 508 in the first direction 528 and prevent fluid flow in the second flow path 518, and an open position to allow fluid flow through the second flow path 518 in the second direction 530. The flow control device 524 of the illustrated example may be a check valve, a solenoid valve, a pneumatic actuated valve, and/or any other fluid control device to control fluid flow through the opening 526 of the second passageway 514.

In operation, during flight conditions, the ventilation system 300 employs passive ventilation or cooling when ram air is available. Ram air is typically available when the aircraft 100 is traveling with a forward velocity (e.g., during cruising). Ram air enters the opening 304 and is directed toward the engine compartment 404 in the nacelle 202. Thus, the opening 304 provides an inlet when passive air cooling or ventilation is employed. The passive air flows in the first direction 528 through the first flow path 516 of the passageway 302. To prevent the passive air from flowing through the second flow path 518 of the second passageway 514, the flow control device 524 is in a closed position to prevent fluid flow through the opening 526. As a result, the flow control device 524 causes the passive air to flow around the blower 508 and/or the second passageway 514 via the first flow path 516 and into the engine compartment 404. In the illustrated example, the passive air entering the engine compartment 404 is vented through an exhaust (e.g., the nozzle 210) of the turbine engine 206 and is not dumped overboard, thereby adding to the effective thrust of the aircraft engine 102. However, in other examples, the passive air from the engine compartment 404 may be vented overboard via a vent in the nacelle 202.

During static conditions when no forward aircraft velocity and no ram air is available to cool and/or vent the engine compartment 404, the ventilation system 300 employs the blower 508 to generate forced air. The blower 508 is activated to induce airflow in the second direction 530 through the second flow path 518 provided by the second passageway 514. To enable fluid flow through the second flow path 518, the flow control device 524 is moved to an open position. The flow control device 524 enables fluid flow through the opening 526. When the blower 508 is activated and the flow control device 524 is in an open position, the blower 508 draws or sucks air from the engine compartment and vents it overboard via the opening 304 of the nacelle 202. Thus, the opening 304 provides an exit through which air from the engine compartment 404 when the blower is activated to enable fluid flow in the second direction 530. The ventilation system 300 may employ one or more sensors 532 (e.g., flow sensors) to detect airflow conditions in the passageway 302 and/or the first flow path 516. In some examples, the ventilation system 300 may activate the blower 508 and move the flow control device 524 to an open position when the ventilation system 300 detects that the velocity of the aircraft 100 is less than a threshold velocity value.

Figure 6:
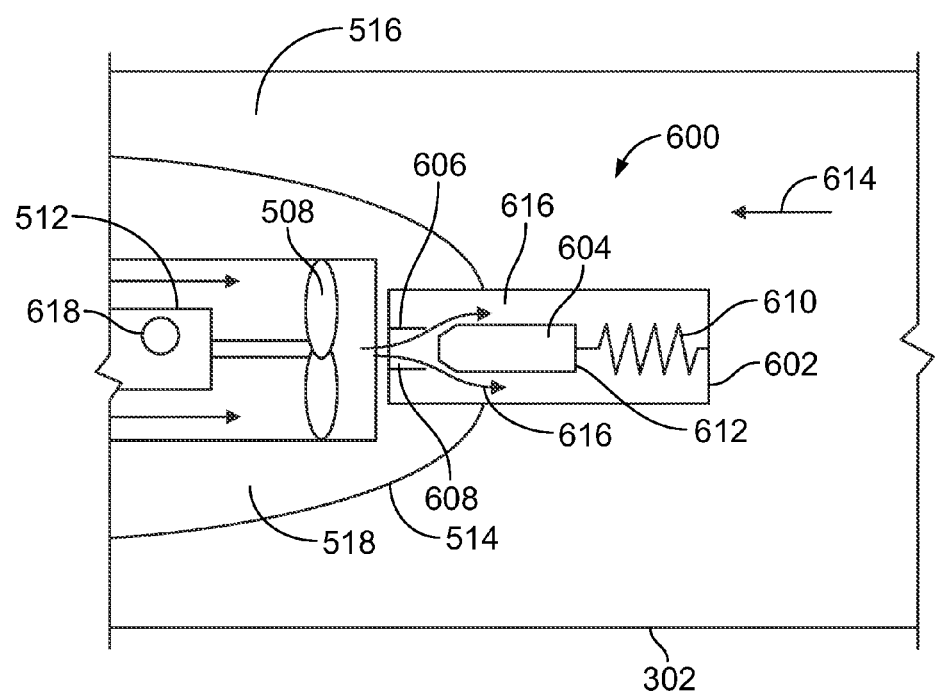
FIG. 6 is a schematic illustration of the ventilation system of FIGS. 1-4 having an example flow control device in accordance with the teachings disclosed herein.

FIG. 6 is an example flow control device 600 that may be used with the ventilation system of FIGS. 1-5. In the illustrated example shown in FIG. 6, the flow control device 600 is a manually operated one-way check valve 602. The check valve 602 includes a valve plug 604 movable relative to a valve seat 606 to control fluid flow through an opening of the check valve 602 defined by the valve seat 606. The check valve 602 includes a spring 610 to bias the valve plug 604 into engagement (e.g., sealing engagement) with the valve seat 606 to prevent fluid flow through an opening 608 between the second flow path 518 and the passageway 302. Thus, when ram air is flowing through the passageway 302 and the first flow path 516, the check valve 602 is moved to a closed position by the spring 610 and/or a force acting on a surface 612 of the valve plug 604 in the direction of arrow 614 provided by the ram airflow in the first direction 528. Conversely, when the blower 508 is activated, forced air 616 provided by the blower 508 acts against the valve plug 604 and the biasing force of the spring 610 to cause the valve plug 604 to move away from the valve seat 606 to an open position and allow fluid flow through the opening 608. In the open position, the forced air 616 provided by the blower 508 can flow through the second flow path 518 and to the opening 304 of the nacelle 202 via the opening 608 of the check valve 602. In some example, a thermocouple 618 may be employed to activate the motor 512 of the blower 508 when a temperature in the engine compartment 404 is greater than a threshold temperature value. In other examples, a control system of the aircraft 100 may activate the blower 508 when the system detects that the velocity of the aircraft 100 is less than a threshold velocity and deactivate the blower 508 when the velocity of the aircraft 100 is greater than the threshold velocity.

Figure 7:
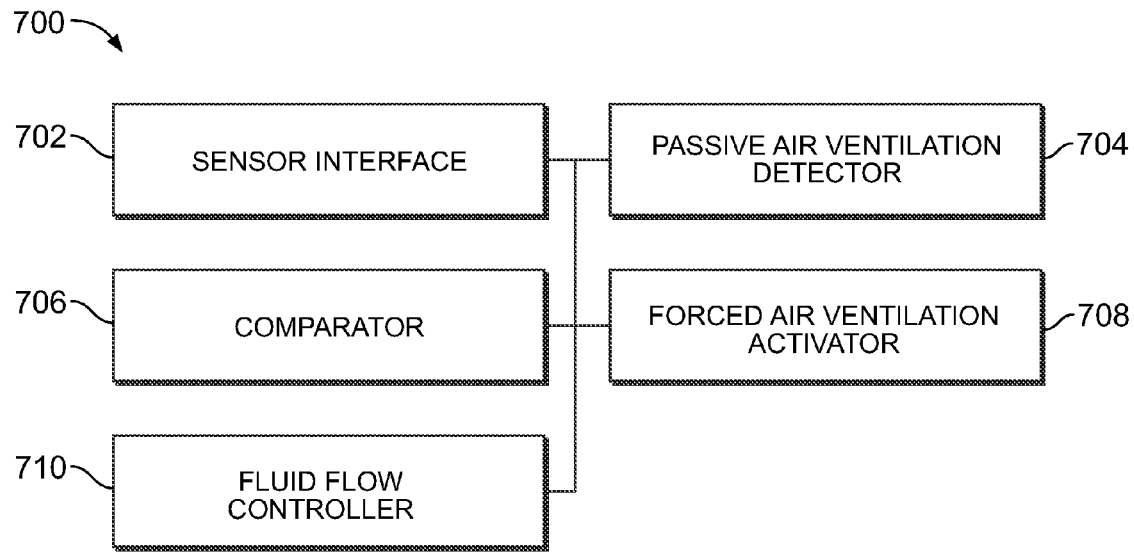
FIG. 7 is a block diagram of an example control system disclosed herein that may be used to implement the example ventilation system of FIGS. 1-6

FIG. 7 is a schematic illustration of an example control system 700 that may be used to automate the ventilation system 300 of FIGS. 1-5. The control system 700 may be communicatively coupled to a main or central control system of the aircraft 100 and/or may be a standalone system. The example control system 700 may be implemented using any desired combination of hardware, firmware, and/or software. For example, one or more integrated circuits, discrete semiconductor components, and/or passive electronic components may be used. Additionally or alternatively, some or all of the blocks of the example control system 700, or parts thereof, may be implemented using instructions, code, and/or other software and/or firmware, etc. stored on a machine accessible or readable medium that, when executed by, for example, a processor system, perform the operations represented in the flowchart of FIG. 8. Although the example control system 700 is described as having one of each block described below, the example control system 700 may be provided with two or more of any block described below. In addition, some blocks may be disabled, omitted, or combined with other blocks.

As shown in FIG. 7, the control system 700 includes a sensor interface 702, a passive ventilation detector 704, a comparator 706, a forced ventilation activator 708, and a fluid flow controller 710. For example, the control system 700 may detect or determine whether passive venting or cooling may be employed or whether forced venting or cooling is needed.

The sensor interface 702 may be configured to receive a signal from a sensor (e.g., the sensor 532 of FIG. 5) to detect the airflow conditions through the passageway 302 and/or the first flow path 516. For example, the sensor interface 702 may receive a signal representative of airflow velocity in the first flow path 516 from the flow sensor 532. Alternatively, the sensor interface 702 may receive a signal from a central computer system of the aircraft 100 indicative of a velocity of the aircraft 100.

The passive ventilation detector 704 may be configured to receive the signal from the sensor interface 702. The passive ventilation detector 704 may be configured to determine if the velocity of the airflow through the first flow path 516 and/or the aircraft velocity is sufficient to provide passive cooling or venting or whether forced cooling or venting is needed. For example, the passive ventilation detector 704 may be configured to send the measured velocity value to the comparator 706. The comparator 706 may be configured to perform a comparison based on the velocity value received from the passive ventilation detector 704 provided by the sensor interface 702 and a threshold velocity value sufficient for passive ventilation or cooling. Additionally or alternatively, the comparator 706 may communicate the results of the comparisons to the forced ventilation activator 708.

The forced ventilation activator 708 may be communicatively coupled to the passive ventilation detector 704 and/or the comparator 706. The forced ventilation activator 708 may be configured to activate or deactivate the blower 508 based on the results provided by the passive ventilation detector 704 and/or the comparator 706. For example, if the results obtained by the passive ventilation detector 704 and/or the comparator 706 indicate that the velocity of the airflow in the first flow path 516 is greater than the threshold velocity value, then the forced ventilation activator 708 deactivates the motor 512 and the blower 508. If the results obtained by the passive ventilation detector 704 and/or the comparator 706 indicate that the velocity of the airflow in the first flow path 516 is less than the threshold velocity value, then the forced ventilation activator 708 activates the motor 512 and the blower 508.

Additionally or alternatively, the passive ventilation detector 704 and/or the comparator 706 may send a signal to the forced ventilation activator 708 based on the velocity value of the aircraft 100. If the results obtained by the passive ventilation detector 704 and/or the comparator 706 indicate that the aircraft velocity is greater than a threshold velocity value, then the passive ventilation detector 704 determines that passive ventilation is sufficient and the forced ventilation activator 708 deactivates the blower 508. If the results obtained by the passive ventilation detector 704 and/or the comparator 706 indicate that the aircraft velocity is less than the threshold velocity value, then the passive ventilation detector 704 determines that passive ventilation is insufficient and the forced ventilation activator 708 activates the blower 508.

The fluid flow controller 710 may be configured to operate a flow control device. For example, the fluid flow controller 710 may control the fluid control device 524 of FIG. 5 between the open position to allow fluid flow through the second fluid flow path 518 and a closed position to prevent fluid flow through the second fluid flow path 518. The fluid flow controller 710 may be communicatively coupled to the sensor interface 702, the passive ventilation detector 704, the comparator 706, and/or the forced ventilation activator 708. The fluid flow controller 710 may be configured to receive a signal from the sensor interface 702, the passive ventilation detector 704, the comparator 706 and/or the forced ventilation activator 708. If the fluid flow controller 710 receives a signal indicative that airflow through the passageway 302 is sufficient for passive ventilation, then the flow controller 710 commands the flow control device to move to a closed position. If the fluid flow controller 710 receives a signal indicative that airflow through the passageway is insufficient for passive ventilation, then the fluid flow controller 710 commands the flow control device to move to an open position.

Additionally or alternatively, the fluid flow controller 710 may be configured to move the flow control device between the open and closed positions based on a signal indicative of whether the blower 508 is activated or deactivated. For example, the fluid flow controller 710 may cause the flow control device to move to an open position when the fluid flow controller 710 receives a signal from the forced ventilation activator 708 indicative of the blower 508 being activated and may cause the flow control device to move to a closed position when the fluid flow controller 710 receives a signal from the forced ventilation activator 708 indicative of the blower 508 being deactivated. Alternatively, the fluid flow controller 710 may not be needed if a manually operated flow control device such as, for example, the check valve 602 of FIG. 6 is employed.

Figure 8:
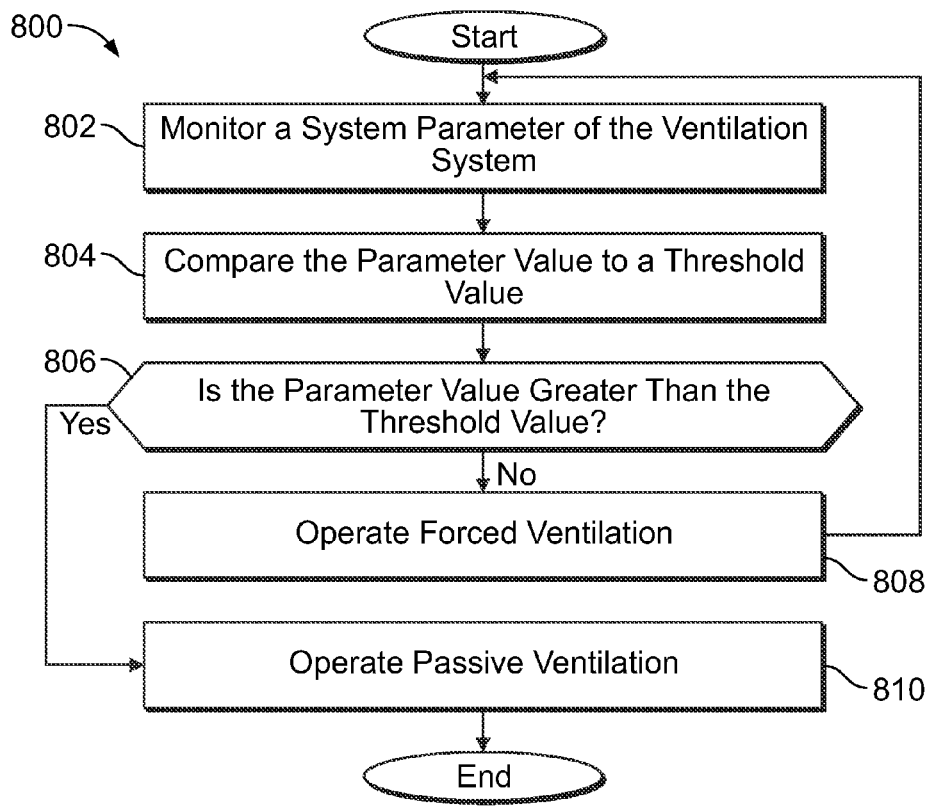
FIG. 8 is a flowchart representative of an example method that may be performed by the example control system of FIG. 7.

FIG. 8 is a flowchart representative of an example method 800 that may be implemented with an example ventilation system 300 and/or the control system 700 of FIGS. 1-7. In this example, the method comprises a program for execution by a processor (e.g., a microprocessor). The program may be embodied in software stored on a tangible computer readable medium such as a CD-ROM, a floppy disk, a hard drive, a digital versatile disk (DVD), or a memory associated with the processor and/or the control system 700, but the entire program and/or parts thereof could alternatively be executed by a device other than the processor and/or embodied in firmware or dedicated hardware. Further, although the example program is described with reference to the flowchart illustrated in FIG. 8, many other methods of implementing the example control system 700 may alternatively be used. For example, the order of execution of the blocks may be changed, and/or some of the blocks described may be changed, eliminated, or combined.

As mentioned above, the example method or process 800 of FIG. 8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

For purposes of discussion, the example method 800 of FIG. 8 is described in connection with the example ventilation system 300 and the example control system 700. In this manner, each of the example operations of the example method 800 of FIG. 8 is an example manner of implementing a corresponding one or more operations performed by one or more of the blocks of the example control system 700 of FIG. 7.

Turning in detail to FIG. 8, the control system 700 monitors a system parameter of a ventilation system 300 (block 802). To monitor a system parameter, the control system 700 receives one or more signals from a sensor (e.g., the sensor 532) and/or the sensor interface 702 to determine whether passive ventilation can be used or whether forced ventilation is needed. For example, the control system 700 may be configured to monitor a velocity of airflow through the first flow path 516 and/or the passageway 302. Alternatively, the control system 700 may receive one of more signals representative of the velocity of the aircraft. The control system 700 receives the signals via the sensor interface 702.

The control system 700 compares the system parameter to a threshold value (block 804). For example, the control system 700 can compare, via the comparator 706, the velocity of airflow received via the sensor to a threshold value retrieved from a look-up table or memory storage. In some examples, the system parameter and/or the threshold value may be based on a velocity value of the aircraft 100 and/or any other operating conditions of the aircraft 100.

The control system 700 may then determine if the system parameter measured by, for example, the sensor 532 is greater than the threshold value (block 806). If the system parameter is less than the threshold value, then the control system 700 operates the ventilation system based on forced air ventilation (block 808). For example, if the airflow velocity in the first flow path 516 and/or the velocity of aircraft 100 is insufficient to provide ram air, then the control system 700 activates forced air ventilation. For example, the forced ventilation activator 708 may provide power to the motor 512 to activate the motor 512 and the blower 508. Additionally, the flow controller 710 may cause the flow control device 524 to move to an open position. After the forced ventilation system is activated, the control system 700 returns to block 802 to continue monitoring the system parameter.

Conversely, if the control system 700 determines that the system parameter is greater than the threshold value at block 806, then the control system 700 operates the ventilation system 300 based on passive ventilation (block 810). For example, if the airflow velocity in the first flow path 516 and/or the velocity of the aircraft 100 is greater than the threshold value, then the control system 700 causes the blower 508 to deactivate and/or causes the flow control device 524 to move to a closed position. For example, the control system 700 may cause the forced ventilation activator 708 to remove power to the motor 512 to deactivate the blower 508. In addition, the control system 700 may cause the flow controller 710 to move the flow control device 524 to the closed position.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
  a passageway to fluidly couple an opening formed in a nacelle of an aircraft engine and an engine compartment of the nacelle, the opening to provide an inlet into the engine compartment when passive airflow is available to vent or cool the engine compartment and the opening to provide an outlet from the engine compartment when forced air is needed to vent or cool the engine compartment, the passive air to flow through the passageway in a first direction from the opening to the engine compartment; and
  a fan positioned in the passageway, the fan to provide the forced air when the passive air is unavailable, the fan to direct the forced air to flow through the passageway in a second direction from the engine compartment to the opening, the first direction being opposite the second direction.

2. The apparatus of claim 1, wherein the passive air is to flow around the fan when the passive air flows through the passageway from the opening to the engine compartment.

3. The apparatus of claim 1, wherein the fan defines a first flow path of the passageway and a second flow path of the passageway when the fan is positioned in the passageway, the first flow path being different than the second flow path.

4. The apparatus of claim 3, further comprising a fluid control device positioned upstream from the fan, the fluid control device to selectively fluidly couple the opening and the second flow path.

5. The apparatus of claim 4, wherein the fluid control device is to move between a first position to prevent the passive air from flowing through the second flow path of the passageway, and a second position to allow the forced air to flow through the second flow path of the passageway and to the outlet.

6. The apparatus of claim 4, wherein the fluid control device comprises a check valve or a solenoid valve.

7. The apparatus of claim 3, wherein the passageway comprises a first duct, the fan including a second duct, the fan being positioned in the second duct, and the second duct being positioned in the first duct, the first duct and an outer surface of the second duct of the fan to define the first flow path, and the second duct to define the second flow path.

8. The apparatus of claim 1, wherein the fan is coaxially and concentrically aligned with a longitudinal axis of the passageway.

9. An apparatus comprising:
an opening formed in a nacelle, the opening to provide an inlet when passive airflow is available to cool or vent an engine compartment in the nacelle and an outlet when forced air is needed to cool or vent the engine compartment in the nacelle;
a passageway fluidly coupling the opening and the engine compartment; and
a blower assembly interposed in the passageway, the blower assembly defining a first flow path of the passageway through which the passive air is to flow from the opening to the engine compartment and a second flow path of the passageway through which the forced air is to flow from the engine compartment to the opening.

10. The apparatus of claim 9, wherein the blower assembly is coaxially and concentrically aligned with the passageway.

11. The apparatus of claim 9, wherein the passageway comprises a first duct fluidly coupling the opening and the engine compartment.

12. The apparatus of claim 11, wherein the blower assembly is supported in the first duct via a bracket.

13. The apparatus of claim 11, wherein the blower assembly includes a fan fluidly coupled to a second duct positioned in the first duct, the second duct supported by the blower assembly.

14. The apparatus of claim 13, wherein the first duct and an outer surface of the blower assembly define the first flow path and the second duct defines the second flow path.

15. The apparatus of claim 14, wherein the blower assembly further comprises a flow control device, the flow control device to prevent the passive air from flowing through the second flow path when the passive air is sufficient to cool or vent the engine compartment and the flow control device to allow the forced air to flow through the second flow path when passive air is insufficient to cool or vent the engine compartment.

16. A method comprising:
venting an engine compartment through an opening of a nacelle via a ventilation passageway in fluid communication with the engine compartment and the opening, the ventilation passageway having a blower system that defines a first path of the ventilation passageway and a second path of the ventilation passageway;
deactivating the blower system when passive air is available to vent or cool the engine compartment to enable the passive air to flow from the opening of the ventilation passageway to the engine compartment in a first direction via the first path; and
activating the blower system when the passive air is unavailable to vent or cool the engine compartment to enable forced air to flow from the engine compartment to the opening of the ventilation passageway in a second direction via the second path.

17. The method of claim 16, further comprising controlling a flow control device to enable the forced air to flow through the second path when the blower system is activated and prevent the passive air from flowing through the second path when the blower system is deactivated.

18. The method of claim 16, further comprising determining whether the passive air is available to vent or cool the engine compartment prior to activating or deactivating the blower system.

19. The method of claim 18, further comprising detecting a velocity of the passive air in the first path to determine if the passive air is available.

20. The method of claim 16, further comprising positioning the blower system in-line with the ventilation passageway.

* * * * *